United States Patent [19]
Martin et al.

[11] 3,724,777
[45] Apr. 3, 1973

[54] MOTION PICTURE PROJECTOR APPARATUS

[75] Inventors: William A. Martin; John Q. Saint Clair, II, both of Rochester, N.Y.

[73] Assignee: Eastman Kodak Company, Rochester, N.Y.

[22] Filed: Oct. 5, 1970

[21] Appl. No.: 77,959

[52] U.S. Cl. ................... 242/195, 226/91, 226/181, 242/189, 242/205, 242/210, 352/158
[51] Int. Cl. ........................... G03b 1/04, G03b 1/58
[58] Field of Search......242/195, 192, 189, 181, 180, 242/208, 210, 205, 207; 226/91, 92; 352/157, 158

[56] References Cited

UNITED STATES PATENTS

| 3,337,146 | 8/1967 | Miyauchi et al. | 242/208 |
| 3,604,657 | 9/1971 | Igarashi | 242/195 |
| 3,405,882 | 10/1968 | Bottani | 242/195 |
| 3,386,674 | 6/1968 | Guernet | 242/195 X |

*Primary Examiner*—George F. Mautz
*Attorney*—Robert W. Hampton and G. Herman Childress

[57] ABSTRACT

Motion picture projector apparatus includes a hook-like member that is adapted to be moved into close proximity to a rotating roll of film or the like for engaging the film through an opening in a leading end portion of the film. The hook member then delivers the leading end portion of the film to self threading apparatus of the projector, and the hook is automatically disengaged from the film. The projector apparatus disclosed provides for automatic rewind of film, and for review or manual rewind of film.

7 Claims, 14 Drawing Figures

FIG. 1

PATENTED APR 3 1973

WILLIAM A. MARTIN
JOHN Q. ST. CLAIR II
INVENTORS

BY *J. Herman Childress*
*Robert W. Hampton*
ATTORNEYS

WILLIAM A. MARTIN
JOHN Q. ST. CLAIR II
INVENTORS

ATTORNEYS

WILLIAM A. MARTIN
JOHN Q. ST. CLAIR II
INVENTORS

BY J. Herman Childers
Robert W. Hampton
ATTORNEYS

WILLIAM A. MARTIN
JOHN Q. ST. CLAIR II
INVENTORS

BY G. Herman Childress
Robert W. Hampton
ATTORNEYS

WILLIAM A. MARTIN
JOHN Q. ST. CLAIR II
INVENTORS

MOTION PICTURE PROJECTOR APPARATUS

CROSS-REFERENCE TO RELATED APPLICATION

Reference is made to the commonly assigned copending U.S. Pat. application Ser. No. 875,819, entitled AUTOMATIC FILM THREADING DEVICE, filed Nov. 12, 1969 in the names of Gerhard Brauning and Wolfgang Ort, now U.S. Pat. No. 3,628,751, issued December 21, 1972.

BACKGROUND OF THE INVENTION

1. Field of Invention

This invention relates to motion picture projector apparatus and, or specifically, to apparatus for automatically feeding film from a roll of film to self threading apparatus of the projector, and to other projector apparatus for effecting review and rewind of film onto the supply roll.

2. Description of the Prior Art

The commonly assigned U.S. Pat. No. 3,429,518, issued Feb. 25, 1969 in the name of E. S. McKee and entitled DEVICE FOR STRIPPING AND FEEDING STRIP MATERIAL FROM A ROLL, discloses a film feeding mechanism comprising an endless belt and a stripping finger that are selectively movable into a cartridge or the like for engaging a film roll within the cartridge. The belt drives the film roll in an unwinding direction and the finger separates the leading end of the film from the roll. The film is then guided by the belt and finger into a film gate and the film feeding mechanism is retracted from the cartridge. Various modifications to the film feeding mechanism disclosed in the McKee patent have been described in various commonly assigned patents and patent applications. The commonly assigned U.S. Pat. No. 3,468,498 issued on Sept. 23, 1969 in the name of L. J. Bunting entitled SUPPLY ROLL SPINDLE ASSEMBLY FOR CINEMATOGRAPHIC PROJECTORS, and the copending U.S. Pat. application Ser. No. 685,616 now U.S. Pat. No. 3,552,683 entitled CINEMATOGRAPHIC PROJECTORS OR THE LIKE AND CARTRIDGES FOR USE THEREWITH, filed in the names of J. J. Bundschuh et al., discloses one such improvement in such a film feeding mechanism, and also discloses various projector mechanisms for effecting rewind, for effecting review of certain portions of the film, and other related projector mechanisms. While the apparatus disclosed in the beforementioned patents and patent applications have proved successful, they tend to be somewhat complex mechanically due to the need to coordinate operation of the drive belt and the stripping finger.

In the beforementioned U.S. Pat. No. 3,628,751, film feeding is achieved by use of a driven sprocket that is engageable with openings in a film strip (such as the usual sprocket holes or perforation normally provided in motion picture film) for driving film from a supply roll to self threading apparatus of a projector. The openings in the film strip are brought into engagement with the sprocket by rotating the film supply roll in a take-up direction, thereby causing the free, leading end portion of the film roll to be swung in a circular path so that it can contact the sprocket which is positioned in such path and aligned with the opening in the film.

SUMMARY OF THE INVENTION

An object of the invention is to provide an improved mechanism for feeding film from a supply roll of film in a cartridge, or from an unenclosed film roll and, more specifically, to provide such a film feeding mechanism which comprises a single element that is engaged by the film.

Another object of the invention is to provide a structurally simple film feeding mechanism engageable with a supply of film and capable of furnishing an end portion of the film to self threading mechanisms of a projector or the like, and then automatically disengaging the film feeding mechanism from the film.

Another object of the invention is to provide structurally simple mechanisms for effecting automatic or manual rewind of film in a motion picture projector.

In accordance with the present invention a film feeding mechanism is provided that comprises a member having a hook portion that is adapted to enter an opening provided in a strip of web material. The member is mounted for movement between a first position wherein a hook portion is closely adjacent to the roll of web material and positioned with respect thereto for entering the opening in the strip to couple the hook portion to the strip in response to rotation of the roll in a take-up direction. The hook portion then is movable to a second position wherein the hook portion is spaced from the roll and the web material is furnished to web feeding apparatus, for example. In the embodiments disclosed latch means are provided for holding the hook member in its first position and for automatically releasing it from its first position for travel to its second position in response to engagement of the hook with the web material. The hook portion is guided during its movement from its first position to its second position and, in the preferred embodiment, is automatically disengaged from the web when the web material is furnished to the web feeding apparatus.

The projector apparatus of the invention also includes means for automatically threading film or other web material through a projector apparatus or the like after the film has been received from the film feeding mechanism of this invention. The projector apparatus includes a web drive member for pulling the web from the roll and furnishing it toward a projection gate, a sound head or the like, and then to automatically disengage the web feeding device in response to an accumulation of web material between the web feeding device and the gate. During review or rewind operations, the web feeding mechanism is disengaged so that film (or other web material) can be rapidly rewound through the gate to the supply roll.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because photographic apparatus are well known, the present description will be directed in particular to elements forming part of, or cooperating more directly with, the present invention, apparatus not specifically shown or described herein being understood to be selectable from those known in the art.

GENERAL DESCRIPTION

Figure 1:
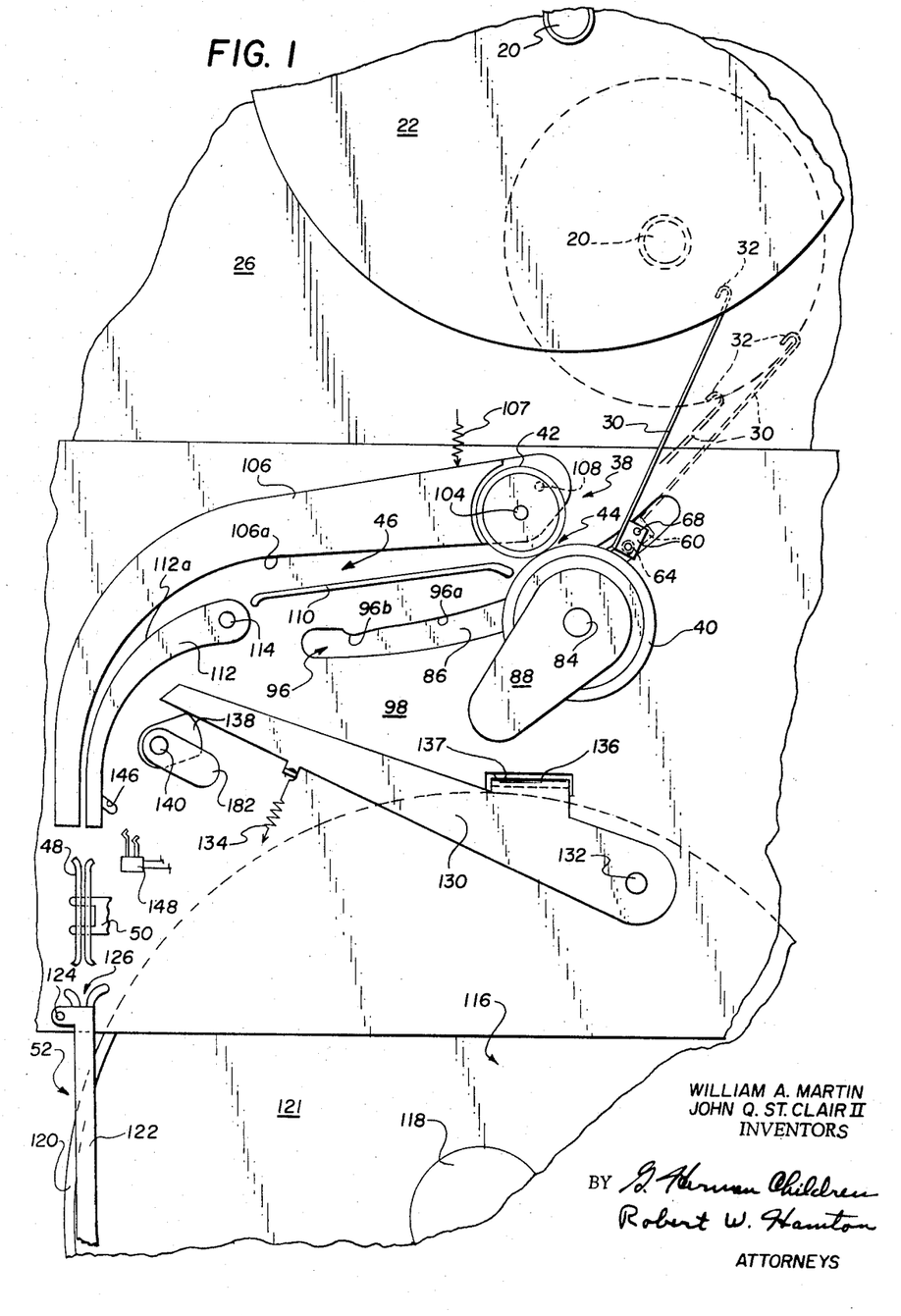
FIG. 1 is a fragmentary plan view illustrating a preferred specific embodiment of motion picture projector apparatus of the invention with the film feeding mechanism extended for engaging film on a film supply real, and showing in phantom the supply spindle moved to accommodate a smaller film reel.

The projector of the invention comprises a film supply spindle 20 which is adapted to receive a film reel 22 containing a supply roll 24 of film F. Reel 22 may be furnished to the projector in a cartridge (not shown). For example, the cartridge may be of the type disclosed in U.S. patent applications Ser. No. 736,524 entitled CARTRIDGE, now U.S. Pat. No. 3,648,952, and 731,562 entitled CARTRIDGE AND MEANS FOR LOCATING A CARTRIDGE ON A PROJECTOR OR THE LIKE now U.S. Pat. No. 3,547,373, both of which were filed on May 23, 1968 in the name of John J. Bundschuh. Spindle 20 projects through a mechanism plate 26. The spindle can be driven in a take-up direction through a suitable tendency drive (not shown), and it may be positively driven at high speed to facilitate rewinding of film onto the film reel. Spindle drives for achieving such functions are well known in the art. Also, the spindle may be movable to each of a plurality of positions, two of which are shown in FIG. 1, so that the projector can receive both large and small size reels in corresponding sized film cartridges. Movement of such a spindle for accommodation of various sizes of film rolls and cartridges is disclosed in U.S. patent application Ser. No. 777,281,entitled CARTRIDGE LOADED PROJECTOR OR THE LIKE, filed Nov. 20, 1968 in the name of Robert J. Roman, now U.S. Pat. No. 3,583,655.

A film feeding mechanism of this invention includes a finger member 30 having a hook 32 on an end portion thereof that is movable into an extended position (FIGS. 1 and 3) wherein it is in close proximity to or engagement with the outer convolution of each of several sizes of film rolls that may be positioned on spindle 20. Film F has a free, leading end portion 34 that is rotated in a generally circular path in a plane just above plate 26 by driving spindle 20 in a film take-up direction. When the hook is in its extended position, it occupies the same plane as the film end portion 34 during rotation of the film roll so that an elongate slot 36 in film end portion 34 registers with hook 32 once during each revolution of the film roll, thereby to engage the hook with the film. The hook is then driven to the position shown in FIG. 5 to deliver the film F to self threading portions of the projector, including a film drive generally designated 38. Drive 38 includes a driven roller or puck 40 and a pressure roller or puck 42 that jointly define a nip 44 into which the film is delivered by the film feeding mechanism. Drive 38 delivers the film through a film guide channel 46 to a projection gate 48. The film is then fed by a claw 50 or by other suitable film feeding mechanisms (such as a sprocket or the like) to a film take-up generally designated 52.

FILM FEEDING MECHANISM

The finger member 30 has a base portion 60 that is pivotally mounted on a sector-shaped lever 62 by a pivot pin 64. A tension spring 66 is connected to a pin-shaped cam follower 68 depending from base portion 60 and to a spring mounting member 70 on lever 62 to bias the finger 30 about pin 64 in a counterclockwise direction as viewed in FIGS. 1 and 2. The bias of spring 66 urges the hook portion 32 toward film roll 24 for bringing the hook portion into close proximity with the outer periphery of the film roll. This mounting of the finger member allows it to remain in contact with the film roll after the hook contacts the film roll if the lever 62 continues to move toward the film roll.

Figures 2, 3:
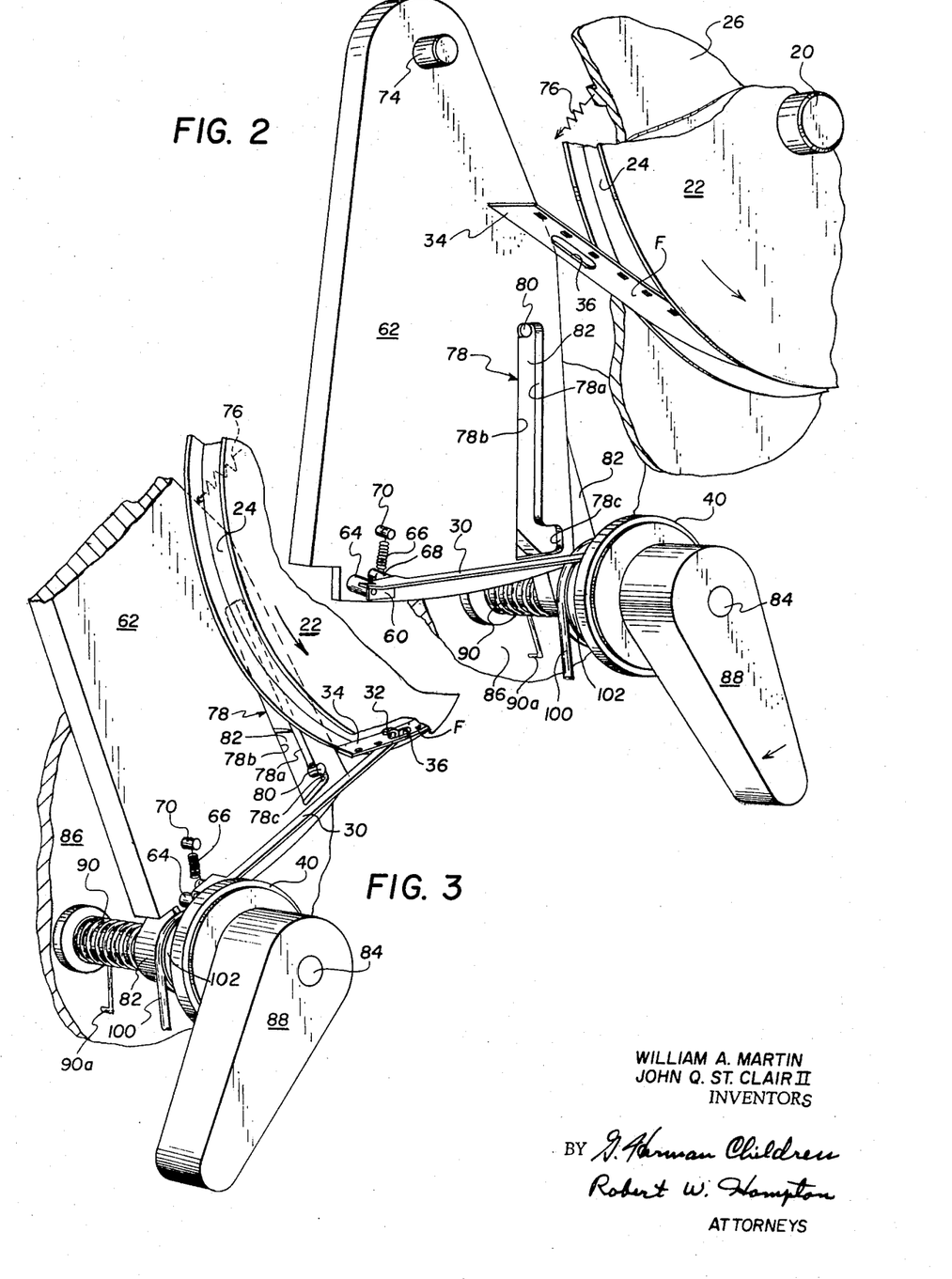
FIG. 2 is a fragmentary perspective view showing the film feeding mechanism of the invention positioned in spaced relation to a roll of web material.
FIG. 3 is a view similar to FIG. 2 showing the position of the film feeding mechanism at the time it becomes engaged with the film.

Lever 62 is mounted for movement about a pivot 74 carried by mechanism plate 26, and it is urged in a clockwise direction as viewed in FIGS. 2 and 3 by a spring diagrammatically shown at 76 that reacts from the mechanism plate against the lever. Lever 62 is mounted in a plane just below the plate 26 and just below the plane occupied by the film reel 22 so that the lever is movable to the FIG. 3 position wherein it is just below the reel 22. This places the hook portion 32 of the film feeding mechanism in the same plane as the film roll and moves the hook portion into a position adjacent to or in contact with the film roll so that it can engage the film through the slot 36 in end portion 34.

Figure 4:
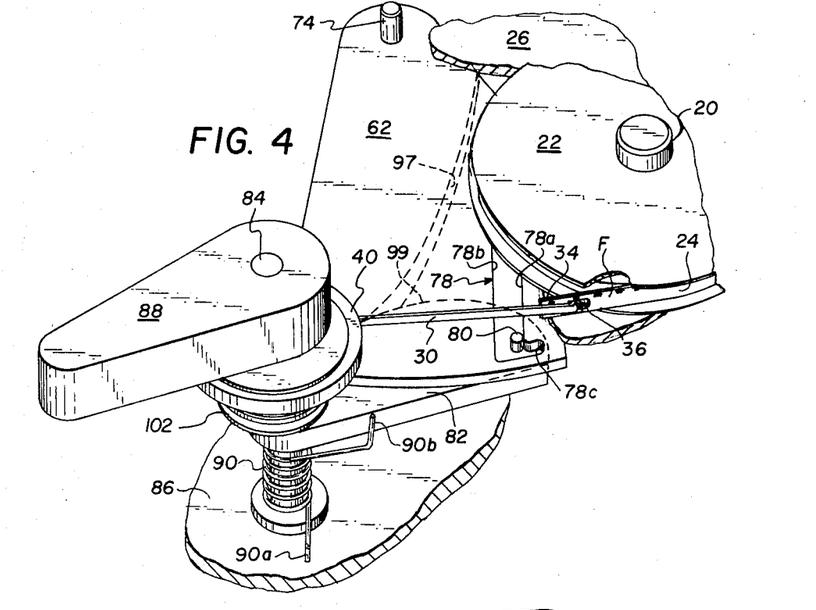
FIG. 4 is another fragmentary perspective view of the film feeding mechanism of this invention but taken from a different direction and showing the film feeding mechanism immediately after it has engaged the film and begun feeding film from the roll.

Lever 62 has a generally L-shaped cam slot 78 comprising opposed elongate side edges 78a and 78b and an offset end portion 78c. The cam slot 78 is located in the end portion of the lever opposite from pivot 74. A cam follower shown in the form of a pin 80 projects upwardly into the cam slot 78 and cooperates with various portions of the slot for moving the lever between the two positions illustrated in FIGS. 2 and 3 and for latching the film feeding mechanism in the position shown in FIG. 3. Pin 80 is carried by a reset arm 82 that is rigidly secured to a shaft 84 for rotation with the shaft about its mounting on a mechanism plate 86. Shaft 84 and arm 82 are moved in a clockwise direction by means of a handle 88 that also is rigidly secured to the shaft 84. The arm and shaft are urged in the opposite (counterclockwise) direction by a spring 90 that has its central portion coiled about shaft 84 and has end portions 90a and 90b connected to plate 86 and to the reset arm 82, respectively, as best illustrated in FIG. 4. Because shaft 84 is adjacent the end of lever 62 that is remote from pivot 74, clockwise rotation of handle 88 or arm 82 produces counterclockwise movement of the lever 62, and vice versa.

During the film feeding operation the spindle 20 is driven in a direction for taking up film onto the film reel through a tendency or friction drive, thereby tending to cause the end portion 34 of the film to fly outwardly from the periphery of the roll 24. Prior to initiation of film feeding operations, the film feeding mechanism of the invention is positioned as shown in FIG. 2 with the hook portion 32 of finger 30 outside the path of movement of the end portion 34 of the film. Handle 88 is then swung in a clockwise direction as viewed in FIGS. 1–3, thereby to move the arm 82 from the position shown in FIG. 2 to the positions shown in FIGS. 1 and 3. As this occurs, the cam follower pin 80 engages surface 78a of the cam slot 78 to move the lever 62 toward the position shown in FIG. 3. As pin 80 reaches the end portion 78c of the cam slot the lever 62 moves back slightly in a clockwise direction under the biasing force of spring 76 so that the pin engages the wall of the lever defining the end portion 78c of the cam slot. Then handle 88 can be released without the lever and arm returning to the FIG. 2 position due to the latching action produced by the pin 80 engaging the cam portion 78c and the bias of springs 76 and 90 which act through lever 62 and arm 82 to hold the pin 80 against the left portion of the cam slot part 78c. At this time the load exerted by the spring 90 onto lever 62 will not exert any torque onto the lever tending to rotate it. It will, of course, tend to maintain the parts in the latched position.

As lever 62 is swung to the FIG. 3 position the finger member 30 is moved with it to bring the hook 32 into the path of movement of the end portion 34 of the film so that the hook can enter the slot 36 during the next or successive rotations of the film end portion past the hook. Experience indicates that this engagement occurs quite rapidly, normally during the first or first few passes of the film after the hook has been moved into its extended position. Engagement of the hook with the film is cushioned to some extent by the spring 66 which allows some pivotal movement of the hook portion by the friction drive or tendency drive applied to the spindle 20. Also, spring 76 permits some additional movement of lever 62 and finger 30 in a counterclockwise direction in response to the force applied to the hook by the film. It is noted that the spring 66 allows some pivotal movement of the hook member about the pin 64 so that the hook member normally can be brought into a position with respect to the spindle so that it can engage the end portion of a film roll having a minimum or maximum size for the particular position of the spindle. In other words, by directing the hook toward the minimum size film roll for a particular spindle position, and by providing spring 66, it is not disadvantageous if the hook portion actually engages the film since it can move under the light spring bias of spring 66 outwardly in response to engagement with the periphery of larger size rolls.

When hook 32 engages the film the driving force applied to the film roll through spindle 20 drives the finger 30, and thus the lever 62 to which it is attached, about the axis of pivot 74 by a distance sufficient to move the pin 80 out of the end portion 78c of the cam slot 78 to the position shown in FIG. 4, thereby unlatching the film feeding mechanism. When this occurs, the force exerted by the spring 90 onto the arm 82 drives the arm counterclockwise about the axis of shaft 84 to bring the cam follower 80 into engagement with the surface 78b of the cam slot. Springs 90 and 76 then exert a driving force onto the lever 62 to return the lever to the position shown in FIGS. 2 and 5. As this occurs the finger 30 attached to the lever is also moved to feed the end portion 34 of the film to the nip 44 of the film drive 38.

The hook and thus the film are guided during movement of the finger member from adjacent the film roll to nip 44 by a guide slot or cam 96 formed in a mechanism plate 98 that is positioned above the lever 62 and just below the film drive pucks 40 and 42. Cam slot 96 is generally arcuate in shape and it is somewhat wider than the cam follower 68 on the base portion 60 of the finger member. The follower is urged toward side edge 96a of the cam 96 by spring 66. The shape of the cam slot 96 and the plane occupied by the hook 32 with respect to the puck members 40 and 42 is such that the leading end 34 of the film is fed into the nip 44. Preferably, drive 38 engages the film along the perforated (upper) side edge of the film so that the drive 38 does not scratch or otherwise damage the picture area of the film. Cam slot 96 has a hump portion 96b that causes the hook 32 to swing downwardly and to the right (as viewed in FIG. 1) immediately after the film is engaged by the drive 38 thereby to urge the hook out of the film path and out of the slot 36 in the film. Thus the hook is swung to the position shown in FIGS. 2 and 5 as the film is advanced by drive 38.

If desired, lever 62 can be driven from arm 82 by providing edges 97 and 99 (FIG. 4) that are shaped and positioned with respect to each other so that edge 99 engages edge 97 to drive lever 62 as arm 82 is swung from one position to another. This drive can be used in lieu of or in addition to the drive effected by cam follower 80 and cam slot 78.

PROJECTOR SELF THREADING MECHANISM

Figure 5:
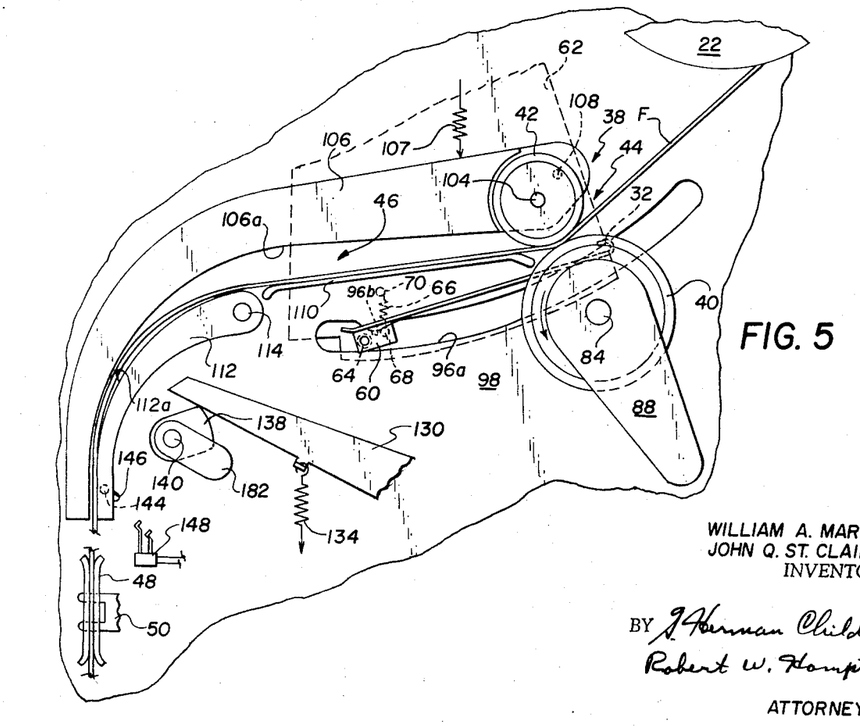
FIG. 5 is a fragmentary plan view of part of the apparatus illustrated in FIG. 1 but showing the position of the film feeding mechanism during projection of film and showing film threaded through the projector.
Figure 6:
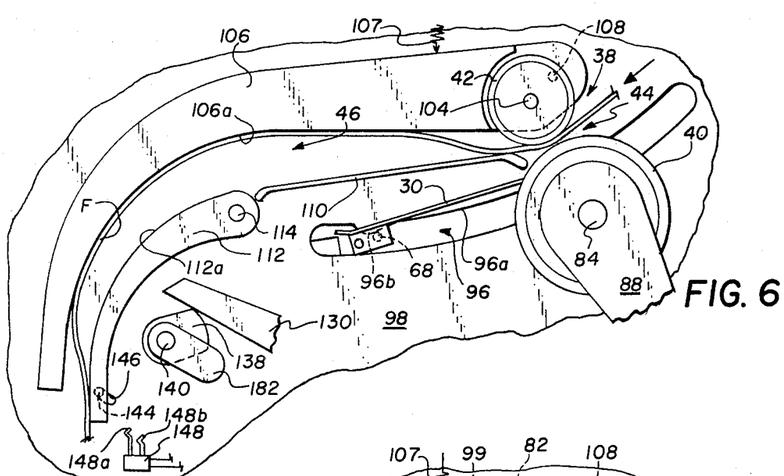
FIG. 6 is a fragmentary plan view illustrating automatic disengagement of portions of the film drive in response to accumulation of a length of film between the film drive and the gate.

Puck drive member 40 is rotatably mounted on shaft 84 for rotation with respect to the shaft, and the puck is driven by a drive belt 100 part of which is shown trained around a pulley 102 coupled to the puck. The drive belt is coupled to a power source (not shown) to constantly drive the puck 40 whenever the projector is operating. Puck 40 is positioned just above the mechanism plate 98 and is in the same plane as the pressure puck or roller 42. Puck 42 is rotatably mounted on a pivot shaft 104 that is carried by one end portion of a lever 106 comprising part of a film loop former. Lever 106 is pivotally mounted on plate 98 by a pin 108 and is biased in a counterclockwise direction by a spring 107. Spring 107 urges puck 42 toward puck 40 so that film received from the film feeding mechanism normally is driven by drive 38 through film guide 46 and toward gate 48 as shown in FIG. 5. Pin 108 is offset from the shaft 104 and separated from the shaft 84 by a distance that is greater than the distance between shaft 84 and pin 104. Pin 108 also is nearer the right end of lever 106 than shaft 104. Because of the geometrical relation between pin 108 and shafts 84 and 104, upward movement of the left end of the lever 106 (as viewed in FIG. 1) lifts puck 42 and thereby separates the pucks 40 and 42. When pucks 40 and 42 are separated in this manner as shown in FIG. 6, the drive 38 is no longer effective to advance film toward the gate, and film can be driven between the pucks toward reel 22.

One side edge 106a of lever 106 defines one side of film guide 46 for film driven toward gate 48 by the drive 38. The other side of the film guide 46 is defined (in part) by a stationary guide member 110 projecting upwardly from plate 98 and (in part) by a side edge 112a of a rewind lever member 112 that is pivoted at 114 to the plate 98. Puck 40 is driven fast enough so that drive 38 tends to move film into the film guide 46 at a rate that exceeds the maximum rate it can be removed from the guide by operation of the claw 50 (or other drive means) at the gate. As film accumulates in the guide 46, it forces the lever 106 in a clockwise direction about its mounting 108 and against the bias of spring 107 to separate the puck members 40 and 42 as shown in FIG. 6 and thereby terminate driving the film toward the gate. As will be apparent from the foregoing description, puck 42 is moved toward and away from puck 40 to engage and disengage drive 38 in response to the demand for film at gate 48, and lever 106 functions as a means for sensing the demand for film at the gate. Thus drive 38 and the associated members are self regulating and serve to form just ahead of the gate during normal forward projection a loop of relatively low tension film. This permits advancing of film through the gate with a minimum of force being applied by the claw or other film drive mechanism at the gate, thereby minimizing wearing and possible tearing of the film. This is particularly advantageous when reel 22 contains a long length of film, i.e., 400' of film. If desired, a self regulating drive similar to that shown at 38 also can be provided at the other side of the gate for minimizing the load on the film at the gate during reverse projection.

FILM TAKE-UP

Figures 9, 10:
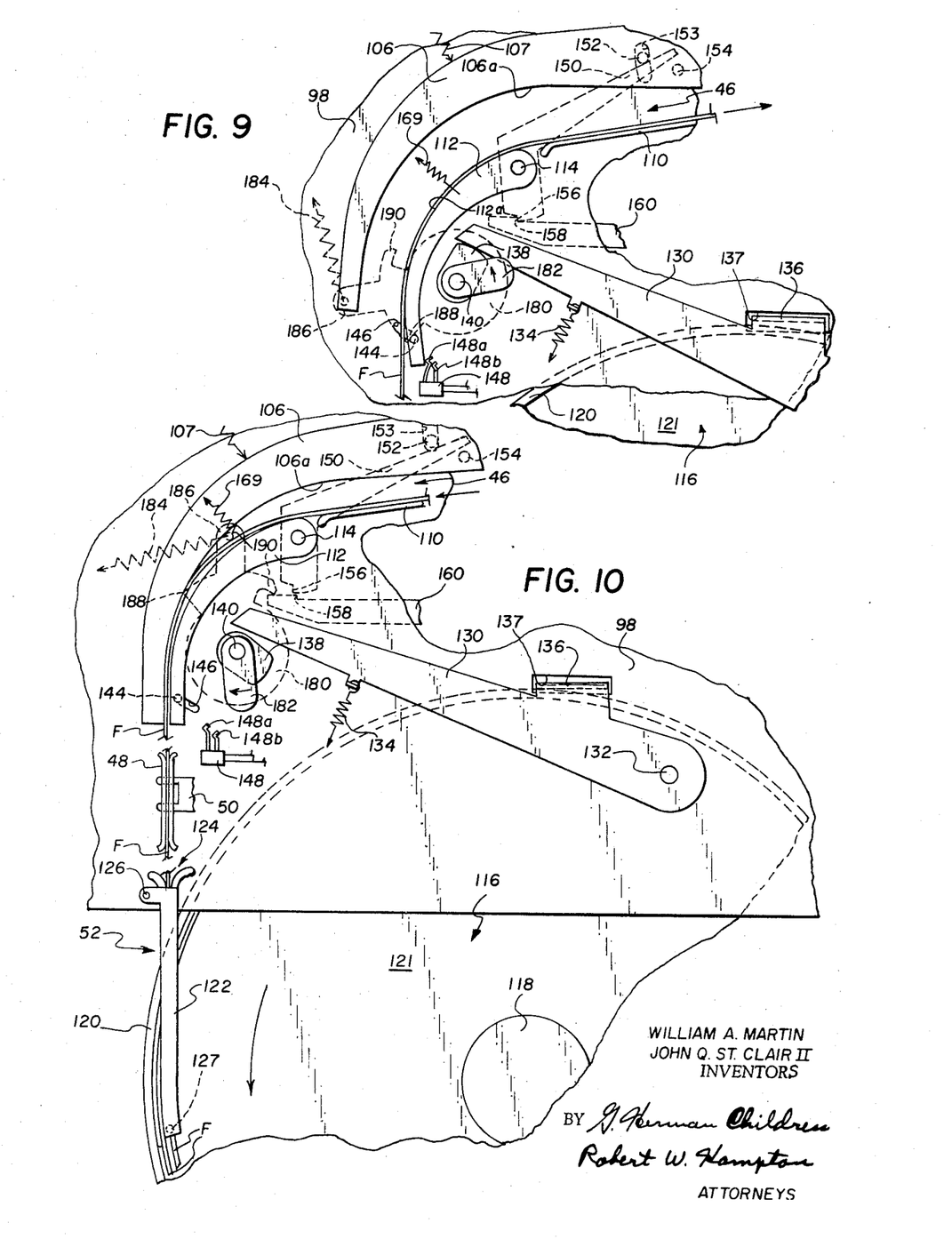
FIGS. 9 and 10 are fragmentary plan views illustrating apparatus for manually initiating review or rewind of film through the projector, and for initiating forward projection of film without operating the film feeding mechanism.

Referring to FIGS. 1 and 10, the film take-up mechanism generally designated 52 includes a take-up cup 116 that normally rotates freely on a spindle 118. The cup has a circular rim 120 extending upwardly around the periphery of a bottom plate 121. Film from gate 48 is guided onto the bottom plate 121 of the cup and inside the rim through an arm 122 that has a film guide channel therethrough. The arm is pivoted at 124 to plate 98 and has a wide, open throat 126 through which film from the gate is guided into the arm. The initial convolution of film is directed to the outside of the cup adjacent the rim 120 and, as shown in FIG. 10, subsequent convolutions are directed inside the preceding convolution by a guide pin 127, thereby filling the cup from the outside toward the center. The cup is rotated by forces exerted onto the cup by delivery of film into the cup. The cup may be completely or partially covered to prevent loss of film from the cup through the top thereof.

While the cup is normally freely rotatable as previously indicated, it may be desirable to brake rotation of the cup during certain operations, e.g., to stop rotation of the cup in a clockwise direction after rewinding of all of the projected film or part of the film (such as occurs during the so-called review operation described in more detail later). The braking mechanism illustrated comprises a lever 130 that is pivoted at 132 to the mechanism plate 98. A spring 134 biases the lever in a counterclockwise direction to urge a flange 136 on the lever toward engagement with the outer periphery of the rim 120 of the cup. Flange 136 projects down through an opening 137 in plate 98. Flange 136 normally is held in spaced relation to the rim of the cup by a brake operating member 138 that is rigidly connected to a shaft 140 on plate 98. The member 138 is engageable with the outer end of lever 130 to prevent movement of the lever in the counterclockwise direction under the influence of spring 134.

AUTOMATIC REWIND

Figures 7, 8:
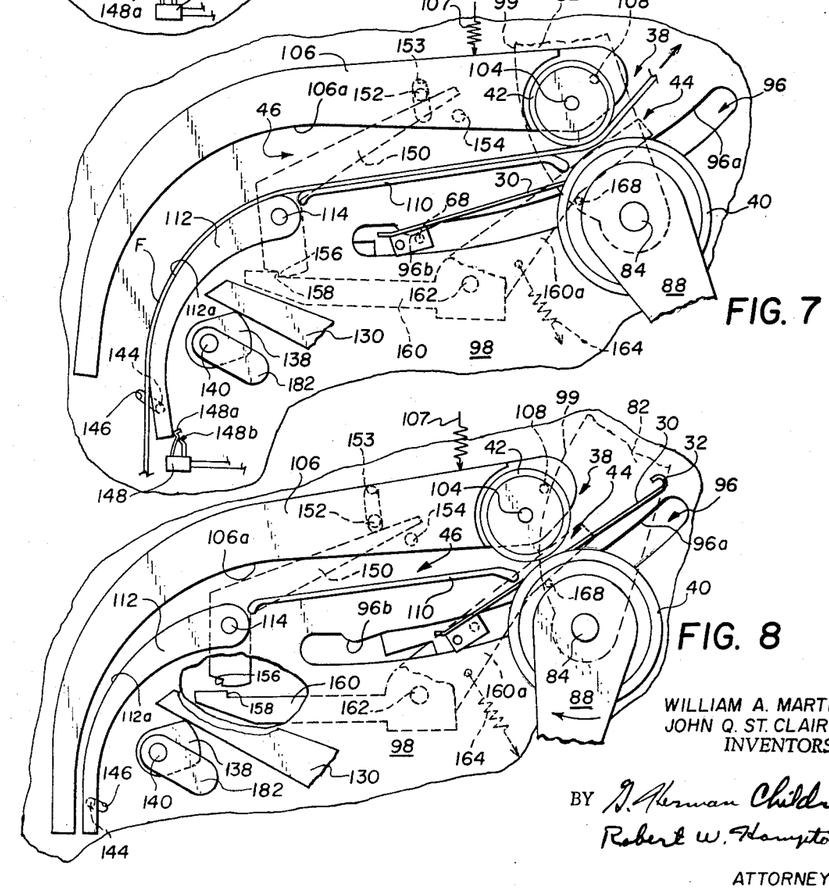
FIG. 7 is a fragmentary plan view showing certain of the projector parts during automatic rewind of film through the projector.
FIG. 8 is a view similar to FIG. 7 showing the manner in which the parts are returned to their normal position following automatic rewind of film.

Apparatus of the invention for initiating automatic rewind of film through the gate onto the supply spindle or reel is best illustrated in FIG. 7 of the drawings. This apparatus is adapted to be operated in response to sensing of an increase in film tension by the side edge 112a of lever 112 such as will occur, for example, at the end of the forward projection cycle of operation if the trailing end of the film is attached to the hub or core of reel 22. The film end can be attached to the reel in the manner disclosed in the commonly assigned U.S. Pat. No. 3,491,965, entitled CARTRIDGE AND REEL ALIGNMENT MEANS, issued on January 27, 1970 in the name of Arthur H. Crapsey, or in any other suitable manner.

As described more fully later, rewind is initiated when lever 112 pivots counterclockwise about the axis of shaft 114 to the position shown in FIG. 7. The extent of this pivotal movement is limited by a pin 144 that projects from the end of lever 112 nearest the gate into a slot 146 in projector plate 98. As pin 144 reaches the lower end of slot 146, the lever 112 closes a switch 148 by bringing a movable contact member 148a into engagement with a stationary contact member 148b.

Switch 148 is functionally connected in a manner not shown to spindle 20 to cause the spindle to be driven in a take-up direction, either through a tendency drive or, preferably, by a direct drive to effect high speed rewind of film onto the supply reel.

During rewind, it is desirable that the film path 46 be opened and that the film drive 38 be disengaged. This is accomplished by means of a lever 150 positioned beneath mechanism plate 98 and secured intermediate its ends to the shaft 114 for rotation with the shaft. The upper end portion of lever 150 is positioned between a stud 152 that projects from lever 106 through a slot 153 in the projector plate 98 and a stud 154 fixed to the lower surface of plate 98. Thus as lever 112 is moved to the FIG. 7 position the upper end of lever 150 engages the pin 152 and moves lever 106 clockwise about its pivot 108, thereby opening the film path 46 and simultaneously disengaging the drive 38 by moving the puck 42 away from puck 40.

The other end portion of lever 150 at the other side of shaft 114 has a notch 156 that defines part of a latch mechanism for holding the rewind apparatus in the engaged position until all the film is fully rewound back onto the reel or until the automatic rewind mechanism is manually disengaged in the manner explained later. The latch member 156 is adapted to engage a complementary notch or latch portion 158 on one end of a latch and reset member 160. Member 160 is pivoted at 162 to the back side of mechanism plate 98 and is normally biased by a spring 164 in a clockwise direction for urging latch portion 158 towards latch member 156. However, as shown in FIG. 8, the latch portions 156 and 158 are normally offset from each other so that they cannot be engaged, and it is the movement of lever 150 in response to film tension acting on lever 112 that brings the latch member 156 to the right from the FIG. 8 position to its FIG. 7 position so that the latch member 158 can swing upwardly under the biasing force of spring 164 to engage the latch and thereby hold the automatic rewind apparatus in engagement.

If desired, a switch (not shown) may be provided between drive 38 and the take-up reel for sensing the presence of film between the drive and the take-up reel. This switch can be coupled to the projector motor (not shown) for shutting off the motor when the switch senses the absence of film. Thus the projector can automatically be turned off at the end of the rewind cycle. This switch would also be useful in the event the user of the projector failed to attach the trailing end of the film to the supply reel. Thus as the trailing end of the film entered the drive 38 the projector motor would be shut off, thereby preventing the entire film strip from being wound onto the take-up mechanism.

The latch member 156 and 158 are automatically disengaged during the next threading cycle by a reset stud 168 that is mounted on reset arm 82 and rotatable with shaft 84 and handle 88 as the handle is moved from the FIG. 7 to the FIG. 8 position. Stud 168 is positioned with respect to an end portion 160a of the lever 160 so that it engages the end portion 160a and causes movement of the lever in a counterclockwise direction as handle 88 is swung to the FIG. 8 position, thereby moving the latch portion 158 away from the latch portion 156. (Lever end 160a and the opposite end of the lever are in different planes to perform their respective functions). Spring 107 then drives the lever 106 toward guide member 110 and lever 112 to narrow the film channel 46 and bring drive puck 42 into engagement with puck 40. As this occurs, the end portion of member 150 is driven clockwise by engagement of member 150 with the pin 152 and this, in turn, partially rotates shaft 114 to return the lever 112 to its FIG. 8 position from its FIG. 7 position. Movement of lever 150 and lever 106 is limited by the pin 144 engaging the upper end of slot 146. If desired, a spring 169 can be provided for biasing lever 112 to its normal (FIG. 8) position when lever 106 is moved away from lever 112 by the pressure of film as described hereinbefore in connection with FIG. 6.

MANUAL REWIND OR REVIEW

FIGS. 9 and 10 illustrate apparatus of the invention for manually initiating rewind of projected film through the gate or for reviewing a particular film sequence by first rewinding a portion of film through the gate and then initiating forward projection operation of the projector. The apparatus shown in FIGS. 9 and 10 comprises a rewind control member 180 that is positioned beneath mechanism plate 98 and is connected to shaft 140 for rotation with the shaft. Control member 180 can be manually moved between its operating positions shown in FIGS. 9 and 10 from its normal rest position (not shown) substantially midway therebetween by means of a handle 182 that is secured to shaft 140 above plate 98. Control member 180, shaft 140, and handle 182 and flange 138 are all biased toward their normal or rest position by a spring 184 that is connected to a finger portion 186 of the control member and to a suitable stationary member, such as the bottom of plate 98.

Two fingers 188 and 190 project from opposite sides of the control member between the shaft 140 and fingers 186. The finger 188 is positioned so that as the handle 182 is swung in a counterclockwise direction to the position shown in FIG. 9, the finger 188 engages the downwardly projecting pin 144 on lever 112 to move the pin through slot 146 and thereby cause lever 112 to close switch contacts 148a and 148b to drive the spindle 20 in a take-up direction. Simultaneously, the lever 150 engages pin 152 on lever 106, thereby to open the film channel 46 and disengage the puck drive members 40 and 42 in the manner described more fully hereinbefore. This action also engages latch members 156 and 158 so that the projector will remain in the rewind mode of operation if handle 182 is released to allow control member 180 to return to its normal position.

When the control member 180 is swung in the opposite direction to its FIG. 10 position, finger 190 is brought into engagement with the outermost end of lever 160, thereby to disengage the rewind latch members 156 and 158. This permits lever 106 to be swung back to the FIG. 10 position under the biasing force of spring 107 and, simultaneously, return the lever 150 to the FIG. 10 position where latch members 156 and 158 cannot re-engage until levers 112 and 150 are again manually returned to their FIG. 9 positions, or until rewind is initiated automatically in the manner previously described.

As is apparent from FIG. 9, during review or when rewind is initiated manually, the brake operating member 138 remains in contact with the lever arm 130 to hold the flange 136 spaced from the rim 120 of the take-up cup 116. However, when the handle 182 is swung to the position shown in FIG. 10 to terminate rewinding of film onto the supply reel, member 138 moves away from lever 130 to permit spring 134 to bring the flange 136 into engagement with the rim 120 of the take-up cup, thereby to brake the cup. If the cup is not stopped promptly, there will be a tendency for the rotation of the cup to push film through the arm 122 toward the gate at the same time the drive 38 begins pushing film in the opposite direction. As soon as handle 182 is released from its FIG. 10 position, spring 184 returns the control member 180 to its normal position approximately midway between the FIG. 9 position and FIG. 10 position, thereby bringing member 138 into engagement with the lever 130 to return the flange 136 to the positions shown in FIG. 1 wherein the flange is spaced from the take-up cup to allow substantially free rotation thereof.

Figures 11, 12, 13:
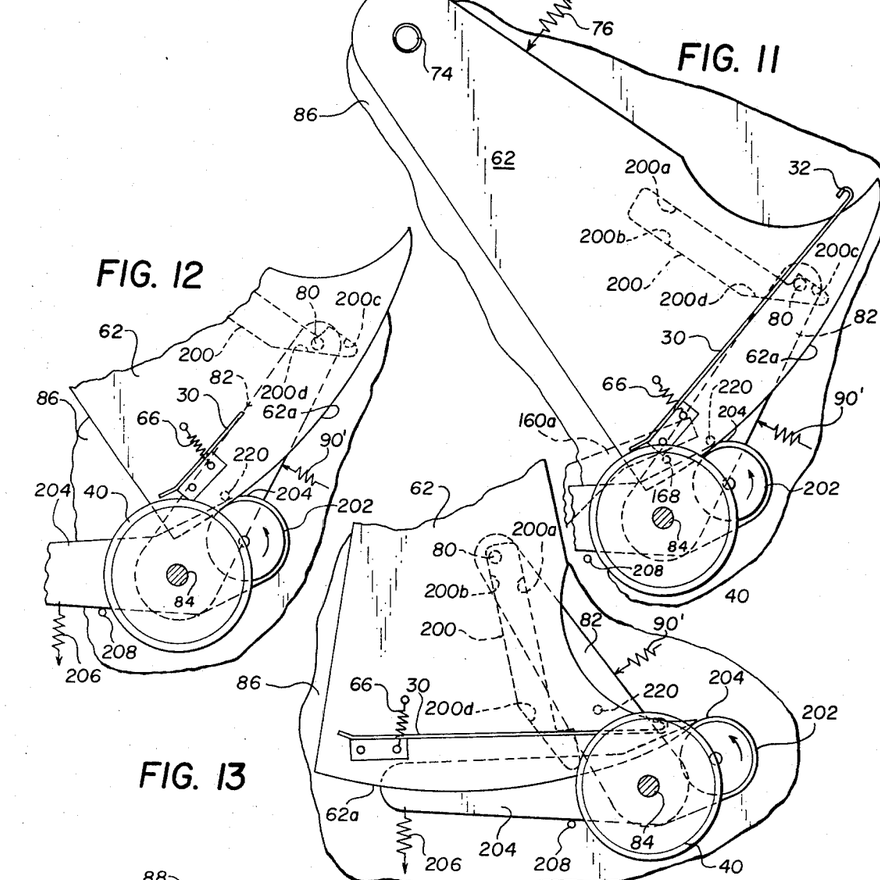
FIG. 11 is a view taken along line 11—11 in FIG. 14 illustrating a modification of the film feeding mechanism of this invention.
FIGS. 12 and 13 are views similar to FIG. 11 showing different positions of the film feeding mechanism of the invention.
Figure 14:
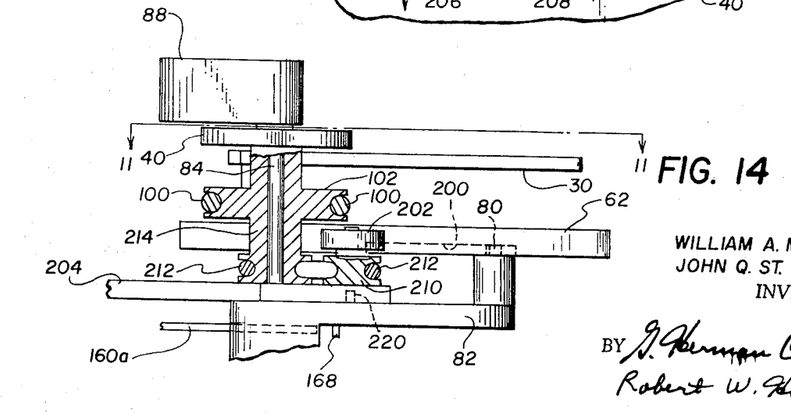
FIG. 14 is a view, partially in cross section, illustrating apparatus for controlling operation of the film feeding mechanisms disclosed in FIGS. 11–13.

FIGS. 11–14 depict an embodiment of the film feeding mechanism of the invention wherein lever 62 is power driven in one direction, i.e., in the direction for pulling film from the supply reel toward the film drive 38. In FIGS. 11–14 the same reference numerals have been used to designate the same or similar parts described hereinbefore. In this embodiment the lever 62 has a groove 200 formed in its lower surface which is adapted to receive the cam follower pin 80 that is carried by reset arm 82. The cam groove 200 has spaced side edge portions 200a and 200b and an offset end portion 200c that is somewhat wider than the pin 80. The groove has a portion 200d that tapers from edge 200b toward end 200c. As shaft 84 is rotated in a clockwise direction by movement of handle 88 to move the hook 32 into close proximity with the roll of film on the supply reel, the cam follower pin 80 engages surface 200a of the cam slot until the pin is adjacent the area 200c of the cam slot. Then the edge 200d cams the pin into portion 200c of the slot and near the right end thereof as viewed in FIGS. 11 and 12. Upon release of the handle 88 a spring 90' moves the reset arm 82 in a counterclockwise direction to bring the pin into engagement with the notch or corner at the left end of the cam slot portion 200c as illustrated in FIG. 11. The lever 62 remains cocked in this position with the hook 32 in engagement with the film roll or closely adjacent thereto.

When the film is engaged with hook 32, the force applied to the hook by the film moves the hook and thus the lever 62 upwardly and to the right as viewed in FIGS. 11 and 12 to bring the pin 80 into engagement with the tapered edge 200d of the cam slot as shown in FIG. 12. Pin 80 is then free to travel along groove portions 200d and 200b to its rest position (FIG. 13) wherein it is located in the end portion of the groove opposite from portion 200c.

In this embodiment the lever 62 and thus the hook portion 32 are driven from the FIG. 11 position toward the FIG. 13 position by a lever drive puck or roller 202 supported at one end of a lever 204 that is rotatable about shaft 84. Lever 204 is biased in a counterclockwise direction by a spring diagrammatically shown at 206, and movement of the lever in this direction is limited by a stop 208 on mechanism plate 86. This mounting allows the lever 204 and drive roller 202 to move counterclockwise under the bias of spring 206 to bring the roller into engagement with lever 62. Drive roller 202 is connected to a pulley 210 that is driven by a belt 212. Belt 212 is trained around pulley 210 and a pulley portion 214 that is integral with (or at least coupled to) pulley 102. Thus drive roller 202 normally is driven continuously in the direction shown in FIGS. 11–13.

When the parts are in the position shown in FIG. 11, the drive roller 202 is held out of engagement with the side edge 62a of lever 62 by a pin 220 on reset arm 82 that engages one end portion of lever 204 adjacent to roller 202. However, when the arm 82 moves toward its FIG. 13 position, the drive roller 202 is moved by spring 206 into engagement with edge 62a of lever 62. The drive roller then drives the lever 62 in a clockwise direction, thereby to pull the hook portion toward drive 38 in a controlled manner and at a substantially constant speed, thereby reducing the possibility of tearing the film in the area of the slot 36. As lever 62 reaches its most clockwise position (FIG. 13) the drive roller 202 becomes disengaged from the lever edge 62a due to the roller running off of the end of the edge 62a of the lever. Drive roller 202 continues to rotate during operation of the projector but no longer engages the lever 62 due to the operation of springs 76 and 90' which hold the lever 62 in the position shown in FIG. 13 until the next film feeding cycle of operation begins. As the next film feeding cycle begins, the lever 62 may be moved from the FIG. 13 to the FIG. 11 position even though surface 62a may contact drive roller 202 since the roller is free to move away from that drive surface against the bias of spring 206.

While drive roller 202 has been described as a means for driving the film feeding mechanism away from the film reel, it will be understood that it, or a separate drive roller, can also be used for driving lever 62 in the opposite direction i.e., for moving the hook 32 toward the film cartridge and supply reel. The same drive roller can be used for performing both functions by selectively moving it into engagement with one of two drive surfaces on opposite side edges of a slot in lever 62 in response to operating a switch to selectively energize or de-energize a solenoid for moving the drive roller between its two driving positions. Similarly, other manually operated functions of the apparatus described herein can be power driven if desired.

The invention has been described in detail with particular reference to preferred embodiments thereof, but it will be understood that variations and modifications can be effected within the spirit and scope of the invention.

We claim:

1. Apparatus for feeding a leading end portion of a strip of web material from a roll of such material to web drive means, the roll being rotatable in a direction for taking-up web material onto the roll and the web having an opening in its leading end portion, the apparatus comprising:

means movable along a path between a first position relatively close to the roll and a second position relatively remote from the roll;

a finger member pivotally mounted at one end to said movable means, said finger member having at the other end thereof a hook portion adapted to enter the opening in the web strip for feeding strip material from the roll;

means resiliently supporting said finger member so as to permit relative movement between said finger member and said movable means during movement of said movable means along the path to its first position for enabling said finger member to move outwardly upon contacting the outer periphery of the roll of web material whereby rolls of different effective diameters can be accommodated and into position with respect to the roll to allow said hook portion to be coupled to the opening in the strip in response to rotation of the roll in a take-up direction;

means for holding said movable means and for releasing said movable means for movement in its first position to its second position;

means coupled to said movable means for moving said movable means between the first position and its second position; and means for guiding movement of said hook portion of said finger member during movement of said movable means from its first position to its second position so that a strip coupled to said hook portion is delivered by said hook portion to the web drive means during such movement of said movable means.

2. Apparatus as set forth in claim 1 wherein said movable means comprises a lever mounted for pivotal movement about a first axis, said finger member being carried by said lever, said lever having a slot therein; and said moving means comprises a follower disposed in said slot, and means coupled to said follower for moving said follower about a second axis spaced from said first axis thereby to effect movement of said lever between its first position and its second position.

3. Apparatus as set forth in claim 2 wherein said means coupled to said follower comprises (1) a spring for urging said follower in one direction with respect to said slot to effect movement of said lever from its first position to its second position, and (2) a handle for moving said follower to effect movement of said lever from its second position to its first position.

4. Apparatus as set forth in claim 1 wherein said holding means comprises means defining an elongate slot having end portions offset from each other, a follower disposed in said slot and movable from one end portion to the other end portion thereof, and means biasing said follower against a portion of said slot defining means thereby to latch said movable means in its first position.

5. Apparatus for feeding a leading end portion of a strip of web material from a roll of such material to web drive means, the roll being rotatable in a direction for taking-up web material onto the roll and the web having an opening in its leading end portion, the apparatus comprising:

a member having a hook portion adapted to enter the opening in the web strip for feeding strip material from the roll;

a lever having a surface formation thereon, said lever mounting said member and being pivotally movable about a first axis between (1) a first position wherein the hook portion is adjacent the roll of web material and positioned with respect thereto for entering the opening in the strip to couple the hook portion to the strip in response to rotation of the roll in a take-up direction and (2) a second position wherein the hook portion is separated from the roll;

means for holding said lever in its first position and for releasing said lever for movement to its second position;

a follower disposed in said surface formation;

means coupled to said follower for moving said follower about a second axis spaced from said first axis thereby to effect movement of said lever between its first position and its second position, said follower moving means including a drive roller selectively engageable with said lever to effect movement of said lever from its first position to its second position; and means for guiding movement of the hook portion of said member during movement of said lever from its first position to its second position so that a strip coupled to the hook is delivered by the hook portion to the web drive means during such movement of said hook portion.

6. Apparatus for feeding a leading end portion of a strip of web material from a roll of such material to web drive means, the roll being rotatable in a direction for taking-up web material onto the roll and the web having an opening in its leading end portion, the apparatus comprising:

means mounted for movement about an axis between a first position relatively close to the roll and a second position relatively remote from the roll;

a finger having at one end portion thereof a hook adapted to enter the opening in the web strip for feeding strip material from the roll, said finger being pivotally mounted at the other end thereof to said mounted means;

means resiliently supporting said finger for enabling movement of said finger relative to said mounted means during movement of said mounted means about the axis to its first position for permitting said finger to move outwardly upon contacting the outer periphery of the roll of web material whereby the rolls of different diameter can be accommodated and into position with respect to the roll to allow said hook to be coupled to the opening in the strip in response to rotation of the roll in the take-up direction;

latch means coupled to said mounted means for holding said mounted means in its first position and for releasing said mounted means for movement to its second position;

means coupled to said mounted means for moving said mounted means between its two positions; and means for disengaging said hook from the strip in response to movement of said mounted means to its second position so that a strip coupled to said hook is freed for advancement by the web drive means.

7. Apparatus for feeding a leading end portion of a strip of web material from a roll of such material to web drive means, the roll being rotatable in a direction for taking-up web material onto the roll and the web having an opening in its leading end portion, the apparatus comprising:

a finger having at one end portion thereof a hook adapted to enter the opening in the web strip for feeding strip material from the roll;

a finger mounting member movable between each of two positions, the other end portion of said finger being pivotally connected to said mounting member for movement with said member between (1) a first position wherein the hook is adjacent the roll of web material and positioned with respect thereto for entering the opening in the strip to couple the hook to the strip in response to rotation of the roll in a take-up direction and (2) a second position wherein the hook is separated from the roll for feeding strip material from the roll;

latch means coupled to said finger mounting member for holding said hook in its first position and for releasing said member for movement of said hook to its second position;

means coupled to said member for moving said member between its two positions;

a cam follower connected to said finger; and means defining a cam surface engageable by said follower in response to movement of the hook to its second position so that a strip coupled to the hook is freed for advancement by the web drive means.

* * * * *